US012801060B2

(12) United States Patent
Yoshioka

(10) Patent No.: US 12,801,060 B2
(45) Date of Patent: Nov. 17, 2026

(54) IMAGE FORMING APPARATUS INCLUDING CORONA DISCHARGING DEVICE

(71) Applicant: KYOCERA Document Solutions Inc., Osaka (JP)

(72) Inventor: Kazuki Yoshioka, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 19/247,510

(22) Filed: Jun. 24, 2025

(65) Prior Publication Data

US 2026/0003302 A1 Jan. 1, 2026

(30) Foreign Application Priority Data

Jun. 27, 2024 (JP) ................................ 2024-103729

(51) Int. Cl.
*G03G 15/00* (2006.01)
*G03G 15/02* (2006.01)

(52) U.S. Cl.
CPC ..... *G03G 15/0291* (2013.01); *G03G 15/0275* (2013.01); *G03G 15/6552* (2013.01)

(58) Field of Classification Search
USPC .......................................................... 399/172
See application file for complete search history.

(56) References Cited

U.S. PATENT DOCUMENTS 11,829,101 B2 11/2023 Fujita et al.
2017/0031257 A1* 2/2017 Konishi ............ G03G 15/0258
2023/0021525 A1 1/2023 Fujita et al.

FOREIGN PATENT DOCUMENTS

JP H04156471 A 5/1992
JP 2005-070099 A 3/2005
JP 2007-241175 A 9/2007
JP 2023-015991 A 2/2023

OTHER PUBLICATIONS

Extended European Search Report issued in EP 25180647.7-1001 by the European Patent Office on Nov. 14, 2025.

* cited by examiner

*Primary Examiner* — Quana Grainger
(74) *Attorney, Agent, or Firm* — Studebaker Brackett PLLC

(57) ABSTRACT

An image forming apparatus includes an apparatus main body and a drum unit. The apparatus main body has an opening and a drum unit storage part communicating with the opening. The drum unit is detachably attached to the drum unit storage part through the opening. The drum unit includes photosensitive drum, a corona discharging device and a drum cover. The corona discharging device corona-charges the photosensitive drum. The drum cover is turnable in a protective posture for covering the photosensitive drum and an exposure posture for exposing the photosensitive drum. When the drum unit is attached to the drum unit storage part, the drum cover is turned from the protective posture into the expose posture to block a flow path communicating a space around the corona charging device with an outside of the apparatus main body.

4 Claims, 3 Drawing Sheets

IMAGE FORMING APPARATUS INCLUDING CORONA DISCHARGING DEVICE

INCORPORATION BY REFERENCE

This application is based on and claims the benefit of priority from Japanese patent application No. 2024-103729 filed on Jun. 27, 2024 which is incorporated by reference in its entirety.

TECHNICAL FIELD

The present disclosure relates to an image forming apparatus provided with a corona charging device which charges a photosensitive drum.

BACKGROUND

In an image forming apparatus provided with a corona charging device, it is necessary to take measures to prevent ozone generated during corona charging from being discharged outside the apparatus.

The image forming apparatus may include a charging exhaust duct provided with a filter. In addition, the image forming apparatus may be provided with a blocking part which closes a space from an ozone discharge space to an intake port of an ozone discharge duct together with a photosensitive drum so as to form an ozone remaining space.

In the former image forming apparatus, since the charging exhaust duct and the filter are required, the number of parts increases, which increases the cost. In the latter image forming apparatus, it is necessary to form the ozone remaining space, and the apparatus becomes large.

SUMMARY

An image forming apparatus of the present disclosure includes an apparatus main body and a drum unit. The apparatus main body has an opening and a drum unit storage part communicating with the opening. The drum unit is detachably attached to the drum unit storage part through the opening. The drum unit includes photosensitive drum, a corona discharging device and a drum cover. The corona discharging device corona-charges the photosensitive drum. The drum cover is turnable in a protective posture for covering the photosensitive drum and an exposure posture for exposing the photosensitive drum. When the drum unit is attached to the drum unit storage part, the drum cover is turned from the protective posture into the expose posture to block a flow path communicating a space around the corona charging device with an outside of the apparatus main body.

The above and other objects, features, and advantages of the present disclosure will become more apparent from the following description when taken in conjunction with the accompanying drawings in which a preferred embodiment of the present disclosure is shown by way of illustrative example.

DETAILED DESCRIPTION

Hereinafter, with reference to the drawings, an image forming apparatus according to an embodiment of the present disclosure will be described.

Figure 1:
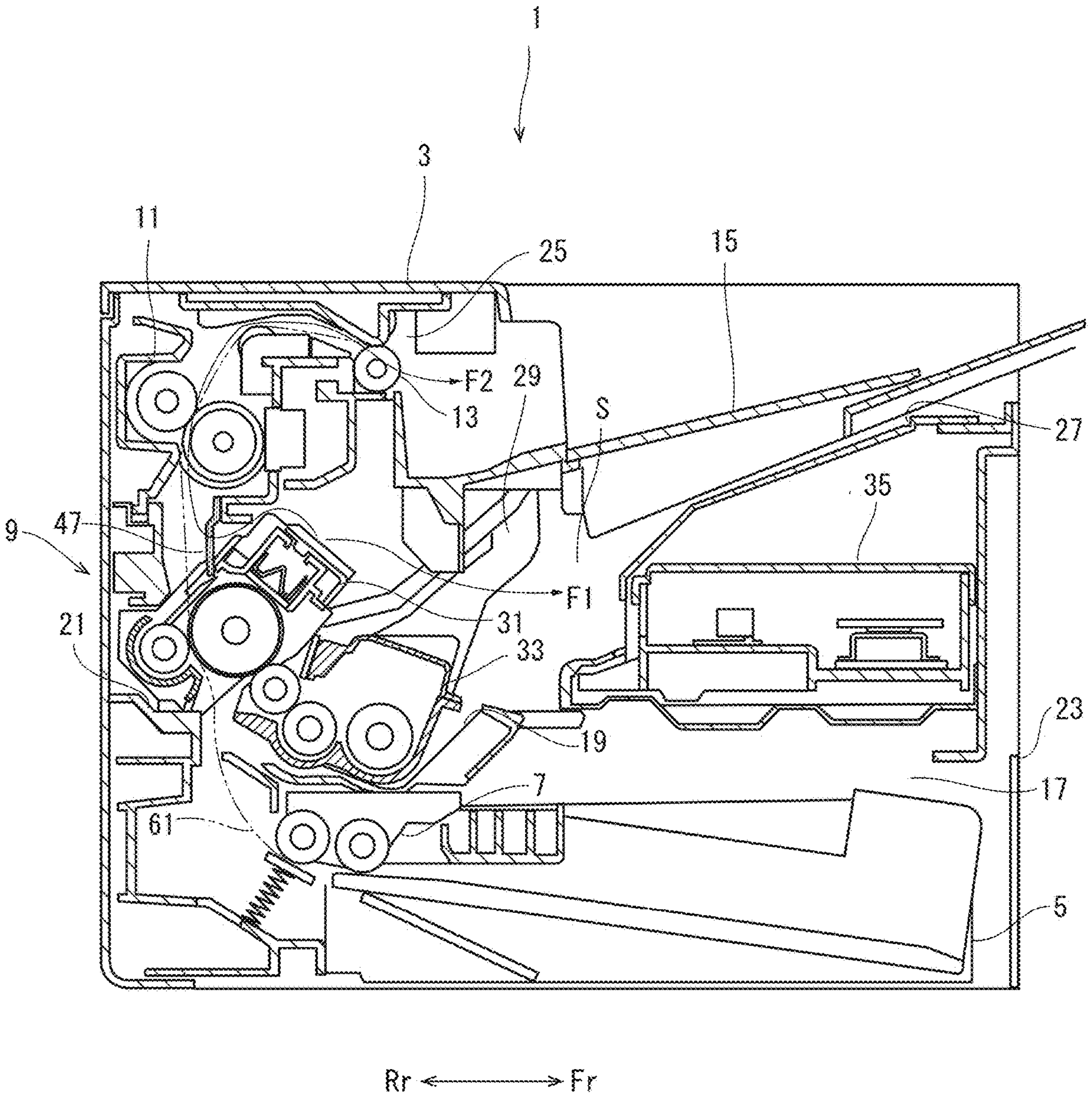
FIG. 1 is a front view showing a structure of an image forming apparatus according to one embodiment of the present disclosure.

First, with reference to FIG. 1, the structure of the image forming apparatus 1 will be described. FIG. 1 is a front view schematically showing the internal structure of the image forming apparatus 1. The reference numerals Fr and Rr assigned to the following drawings indicate the front side and the rear side, respectively.

An apparatus main body 3 of the image forming apparatus 1 stores a sheet feeding cassette 5 in which sheets are stored, a sheet feeding device 7 which feeds the sheet from the sheet feeding cassette 5, an image forming part 9 which forms a toner image on the sheet in an electrophotographic manner, a fixing device 11 which fixes the toner image on the sheet, a discharging device 13 which discharges the sheet, and a discharge tray 15 on which the discharged sheet is loaded.

In a lower portion inside the apparatus main body 3, a sheet feeding cassette storage part 17 storing the sheet feeding cassette 5 is formed. Further, above the rear portion of the sheet feeding cassette storage part 17, a developing unit storage part 19 storing a developing unit 33 described later is formed. Further, above the developing unit storage part 19, a drum unit storage part 21 storing a drum unit 31 described later is formed.

Further, a front opening 23 communicating with the sheet feeding cassette storage part 17 is formed on the lower portion of the front surface of the apparatus main body 3. A sheet discharge port 25 facing forward is formed on the upper surface of the apparatus main body 3. Further, on the upper surface of the apparatus main body 3, an upper opening 27 through which the drum unit 31 and the developing unit 33 are attached and detached is formed below the discharge port 25. The upper opening 27 is closed by the discharge tray 15. The discharge tray 15 is turnably provided, and when the discharge tray 15 is turned upward, the upper opening 27 is opened. On the inner surfaces of the left and right side plates of the apparatus main body 3, rails 29 are formed from the upper opening 27 to the developing unit storage part 19 and the drum unit storage part 21.

First, the sheet feeding cassette 5 will be described. The sheet feeding cassette 5 is attached to the sheet feeding cassette storage part 17 through the front opening 23 of the apparatus main body 3 in a drawable manner. The sheet feeding cassette 5 stores the sheets on which an image is to be formed.

Next, the sheet feeding device 7 will be described. The sheet feeding device 7 is disposed above the rear portion of the sheet feeding cassette storage part 17. The sheet feeding device 7 feeds the sheet from the sheet feeding cassette 5 attached in the sheet feeding cassette storage part 17.

Next, the image forming part 9 will be described. The image forming part 9 includes the drum unit 31, the developing unit 33, and an exposure device 35. The drum unit 31 and the developing unit 33 are detachably attached to the drum unit storage part 21 and the developing unit storage part 19. The exposure device 35 is fixedly attached to the apparatus main body 3.

Figure 2:
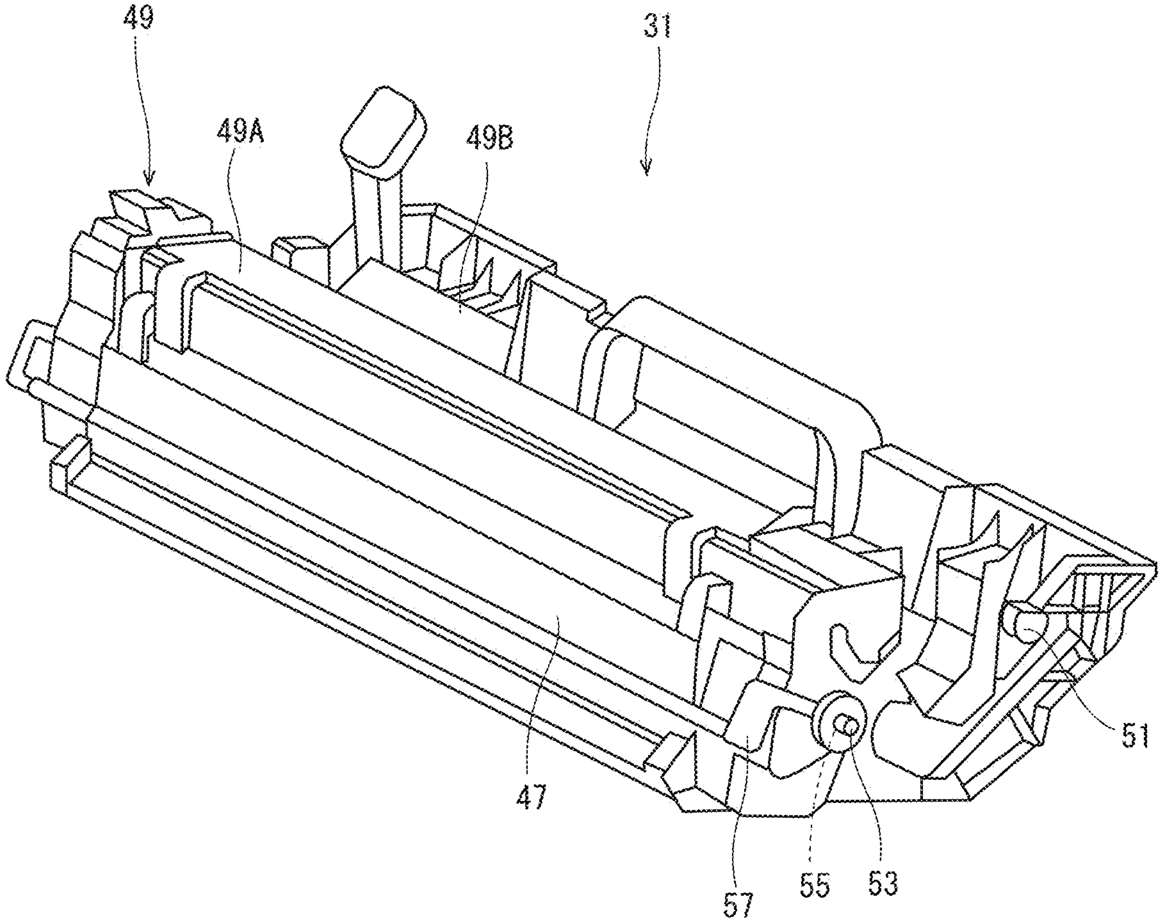
FIG. 2 is a perspective view showing a drum unit in the image forming apparatus according to the embodiment of the present disclosure.
Figure 3:
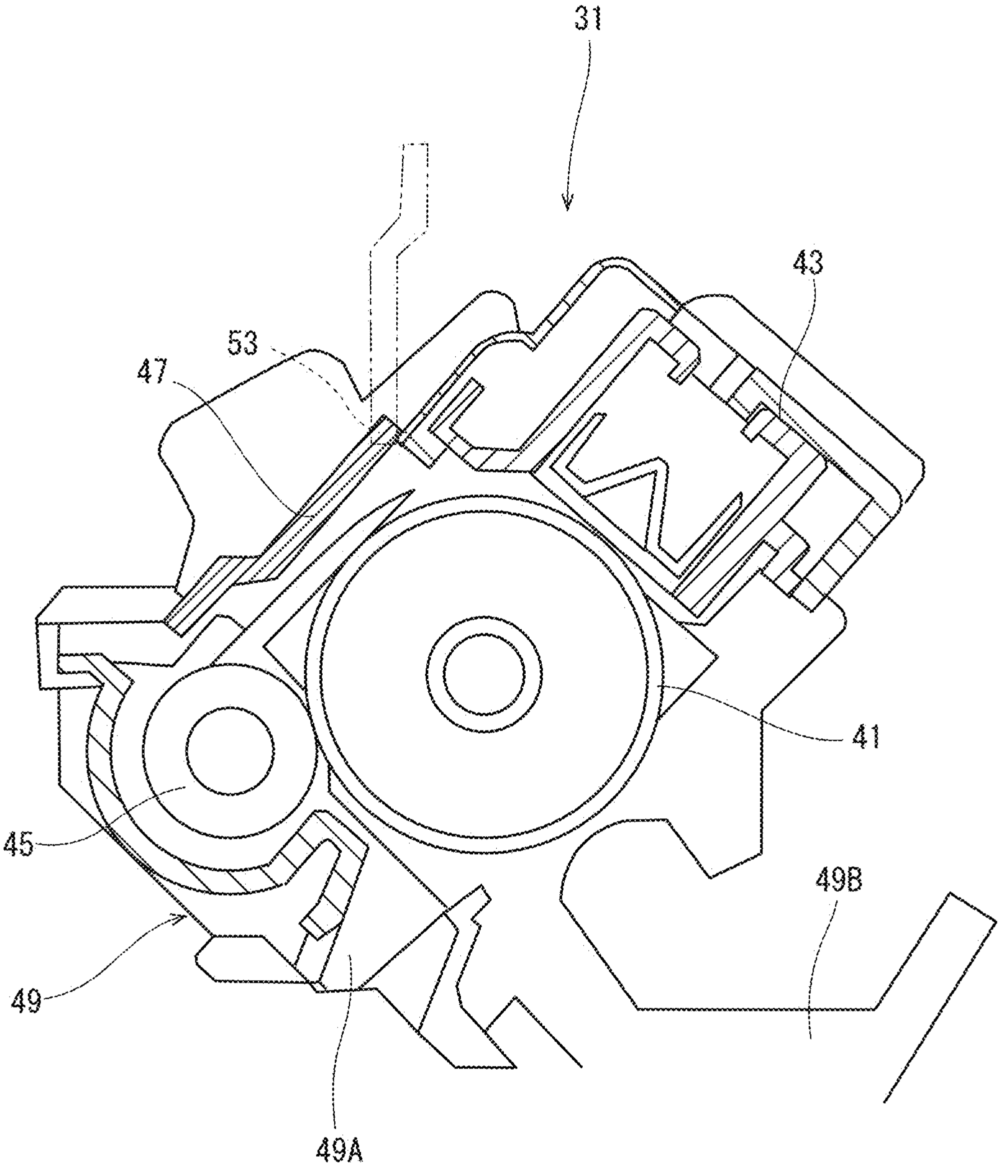
FIG. 3 is a cross-sectional view showing the drum unit in the image forming apparatus according to the embodiment of the present disclosure.

First, the drum unit 31 will be described with reference to FIG. 2 and FIG. 3. FIG. 2 is a perspective view showing the drum unit 31, and FIG. 3 is a cross-sectional view showing the drum unit 31. As shown in FIG. 3, the drum unit 31 includes a photosensitive drum 41, a corona charging device 43, a transfer roller 45, a drum cover 47, and a drum housing 49 on which these are supported.

As shown in FIG. 2, the drum housing 49 has a body part 49A and a supporting part 49B arranged in parallel with each other. The body part 49A supports the photosensitive drum 41, the corona charging device 43, the transfer roller 45, and the drum cover 47. The supporting part 49B is provided with a handle and a positioning portion for positioning the drum unit 31 with the drum unit storage part 21. Guide pins 51 are provided on the side surfaces of the supporting part 49B.

As shown in FIG. 3, the photosensitive drum 41 is rotatably supported by the main body part 49A. The corona charging device 43 and the transfer roller 45 are disposed around the photosensitive drum 41 at predetermined intervals in the circumferential direction of the photosensitive drum 41. A transfer nip is formed between the photosensitive drum 41 and the transfer roller 45. The photosensitive drum 41 is exposed through two spaces along the circumferential direction between the corona charging device 43 and the transfer roller 45. One space (defined as a supporting part's opposite side space) the opposite side to the supporting part 49B, and the other space (defined as a supporting part side space) faces the supporting part 49B.

The drum cover 47 will be described. The drum cover 47 covers the photosensitive drum 41 exposed through the supporting part's opposite side. A rotational shaft 53 is provided at the upper end of the drum cover 47 (the end on the side of the corona charging device 43). The rotational shaft 53 is rotatably supported by the main body part 49A on both sides of the supporting part's opposite side space of the main body part 49A. When the drum cover 47 is turned downward around the rotational shaft 53, as shown in FIG. 2 and the solid line in FIG. 3, the supporting part's opposite side space is closed to protect the photosensitive drum 41 (the posture of the drum cover 47 at this state is defined as a protective posture). When the drum cover 47 is turned upward around the rotational shaft 53, the supporting part's opposite side space is opened and the photosensitive drum 41 is exposed, as shown by the two-dot chain line in FIG. 3 (the posture of the drum cover 47 at this state is defined as an exposure posture).

As shown in FIG. 2, a coil portion of a torsion coil spring 55 is fitted around the rotational shaft 53. The torsion coil spring 55 biases the drum cover 47 to the protective posture. The rotational shaft 53 is provided with an opening/closing lever 57 extending in the radial direction of the rotational shaft 53. When the opening/closing lever 57 is pushed, the drum cover 47 is turned from the protective posture to the exposure posture.

If the drum cover 47 is not provided, in a state where the drum unit 31 is detached from the apparatus main body 3, there is a possibility that the photosensitive drum 41 is exposed through the supporting part's opposite side space and that other members come into contact with the photosensitive drum 41. As will be described later, the drum unit 31 is attached to the drum unit storage part 21 with the main body part 49A forward by gripping the handle of the supporting part 49B. At this time, the photosensitive drum 41 may come into contact with the apparatus main body 3 and damage the photosensitive drum 41. Therefore, by providing such the drum cover 47, the photosensitive drum 41 can be protected. The photosensitive drum 41 is also exposed through the supporting part side space, but since the supporting part 49B exists outside this space, it is difficult for the photosensitive drum 41 to come into contact with other members. Also, when the drum unit 31 is attached to the drum unit storage part 21, the photosensitive drum 41 exposed from the supporting part side space faces rearward in the attachment direction, so that it does not come into contact with the apparatus main body 3. Therefore, even if the photosensitive drum 41 is exposed through the supporting part side space, no major problem occurs.

The drum unit 31 is detachably attached to the drum unit storage part 21 through the upper opening 27 of the apparatus main body 3. More specifically, by gripping the handle of the supporting part 49B of the drum housing 49, engaging the guide pins 51 with the rails 29 with the main body part 49A facing forward, and then moving the guide pins 51 along the rails 29, the drum unit 31 is attached to the drum unit storage part 21.

Further, when the drum unit 31 is moved to the drum unit storage part 21, the opening/closing lever 57 of the drum cover 47 comes into contact with an abutting piece (not shown) provided on the apparatus main body 3. When the drum unit 31 is further moved, the opening/closing lever 57 is pushed by the abutting piece, and the drum cover 47 starts to be turned into the expose posture from the protective posture. When the drum unit 31 is attached to the drum unit storage part 21, the drum cover 47 is completely turned into the exposure posture.

Next, the developing unit 33 will be described. As shown in FIG. 1, the developing unit 33 includes a stirring roller, a supply roller, a developing roller, and a developing housing by which they are supported and which houses a developer. All rollers are rotatably supported by the developing housing. A part of the outer circumferential surface of the developing roller is exposed through an opening formed in the developing housing.

The developing unit 33 is detachably attached to the developing unit storage part 19 through the upper opening 27 of the apparatus main body 3. Guide pins (not shown) are provided on the right and left side plates of the developing housing. By engaging these guide pins with the rails 29 and moving them along the rails 29, the developing unit 33 is attached to the developing unit storage part 19.

When the developing unit 33 is thus attached, the exposed part of the outer circumferential surface of the developing roller through the opening of the developing housing faces the exposed part of the outer circumferential surface of the photosensitive drum 41 through the drum housing 49 of the drum unit 31 at a predetermined interval. A gap through which laser beam emitted from the exposure device 35 can pass is formed between the developing unit 33 and the drum unit 31.

Next, the exposure device 35 will be described. The exposure device 35 is disposed in front of the developing unit storage part 19 and below the upper opening 27.

Next, the fixing device 11 will be described. The fixing device 37 includes a heating roller and a pressure roller, and a fixing nip is formed between both rollers. The fixing device 37 is disposed above the drum unit storage part 21 with a predetermined gap.

Next, the discharging device 13 will be described. The discharging device 13 includes a pair of discharge rollers. The discharging device 13 is disposed inside the discharge port 25.

Further, in the apparatus main body 3, there is formed a conveyance path 61 along which the sheet is conveyed from the sheet feeding device 7 toward the discharging device 13 through the transfer nip of the image forming part 9 and the fixing nip of the fixing device 11.

As shown in FIG. 1, when the drum unit 31 and the developing unit 33 are attached to the respective storage parts 21 and 19, a space S surrounded by the drum unit 31, the developing unit 33, the exposure device 35, the fixing device 11, and the discharge tray 15 is formed below the discharge tray 15. As described above, the space S is a moving space of the drum unit 31 and the developing unit 33 provided between the upper opening 27, and the developing unit storage part 19 and the drum unit storage part 21.

An image forming operation of the image forming apparatus 1 having the above configuration will be described. The sheet fed from the sheet feeding cassette 5 by the sheet feeding device 7 is conveyed to the image forming part 9 along the conveyance path 61. In the image forming part 9, a toner image is formed on the sheet. More specifically, in the drum unit 31, the photosensitive drum 41 is charged by the corona charging device 43 to have a predetermined potential. Then, the exposure device 35 irradiates the photosensitive drum 41 with the laser light based on image data. Thus, an electrostatic latent image is formed on the photosensitive drum 41. In the developing unit 33, the developer housed in the developing housing is stirred by the stirring roller to charge toner, and the charged toner is supplied to the developing roller by the supply roller and held by the developing roller. The held toner is supplied to the electrostatic latent image formed on the photosensitive drum 41, and the electrostatic latent image is developed into a toner image. The toner image is transferred from the photosensitive drum 41 to the sheet in the transfer nip.

The sheet on which the toner image is formed is conveyed to the fixing device 11 along the conveyance path 61, and the toner image is fixed to the sheet in the fixing nip of the fixing device 11. The sheet on which the toner image is fixed is discharged through the discharge port 25 to the discharge tray 15 by the discharging device 13.

As described above, when the drum unit 31 is attached to the drum unit storage part 21, the drum cover 47 is turned into the expose posture. As shown in FIG. 1, the drum cover 47 is turned forward of the transfer nip and the fixing nip. At this time, it is preferable that the drum cover 47 abuts on the housing or the other portion of the fixing device 11. As a result, the conveyance path 61 is separated from the space around the corona charging device 43.

Therefore, air containing ozone generated during the charging by the corona charging device 43 does not flow into the conveyance path 61, but mainly flows into the moving space S from the space around the corona charging device 43, guided by the drum cover 47 (see the arrow F1 in FIG. 1). If the drum cover 47 does not block the conveyance path 61 from the space around the corona charging device 43, a flow path (see the arrow F2 in FIG. 1) is formed from the space around the corona charging device 43 to the discharge port 25 through the conveyance path 61. The air containing ozone may be discharged to the outside through the flow path F2 by riding on an air flow generated with the conveyance of sheet.

However, as shown in FIG. 1, the drum cover 47 blocks the flow path F2. Further, the drum cover 47 forms the exhaust path F1 from the space around the corona charging device 43 to the moving space S below the fixing device 11. The air containing ozone generated by the corona charging device 43 is guided to the moving space S through the exhaust path F1. The ozone guided to the moving space S stays in the moving space S and disappears with the passage of time.

As described above, according to the image forming apparatus 1 disclosed in the present disclosure, the air containing ozone generated by the corona charging device 43 can be retained inside the apparatus main body 3, so that the discharge of ozone to the outside of the apparatus main body 3 can be reduced.

In the case of the drum unit 31 having the configuration shown in FIG. 2, the drum cover 47 for protecting the photosensitive drum 41 is required. By turnably providing the drum cover 47, the photosensitive drum 41 is protected when necessary, and the flow path of ozone can be blocked when the protection of the photosensitive drum 41 is not required because the photosensitive drum 41 is attached to the drum unit storage part 21. Therefore, it is not necessary to add a new member for blocking the ozone flow path. Further, since the moving space S in which the air containing ozone stays is the existing space, it is not necessary to provide a new space for ozone staying. Further, since the drum cover 47 is automatically turned to the expose posture when the drum unit 31 is attached to the drum unit storage part 21, a mechanism for turning the drum cover 47 can be simplified.

The sealed space in which ozone is retained may be other space (for example, the sheet feeding cassette storage part 17) except for the moving space S of the drum unit 31 and the developing unit 33.

While the present disclosure has been described for specific embodiments, the present disclosure is not limited to those embodiments. A person skilled in the art may modify the above embodiments without departing from the scope and spirit of the present disclosure.

The invention claimed is:

1. An image forming apparatus comprising;

an apparatus main body having an opening and a drum unit storage part communicating with the opening, and a drum unit detachably attached to the drum unit storage part through the opening, wherein the drum unit includes:

a photosensitive drum;

a corona discharging device which corona-charges the photosensitive drum; and a drum cover turnable in a protective posture for covering the photosensitive drum and an exposure posture for exposing the photosensitive drum and having a blocking structure, and when the drum unit is attached to the drum unit storage part, the drum cover is turned from the protective posture into the exposure posture to block a flow path communicating a space around the corona charging device with an outside of the apparatus main body.

2. The image forming apparatus according to claim 1, wherein the apparatus main body has a sealed space, and when the drum unit is attached to the drum unit storage part, the drum cover is turned to the exposure posture and forms an exhaust path for communicating the space around the charging device with the sealed space.

3. The image forming apparatus according to claim 2, comprising:

a discharge tray on which the discharged sheet on which an image is formed is loaded and which opens and closes the opening, and the sealed space is a moving space in which the drum unit is moved between the opening and the drum unit storage part.

4. The image forming apparatus according to claim 1, wherein, the apparatus main body includes a fixing device disposed above the drum unit storage part to form a fixing nip through which the sheet passes, when the drum unit is attached to the drum unit storage part and the drum cover is turned to the exposure posture, the drum cover abuts on the fixing device and blocks the space around the charging device from a space including the fixing nip.

* * * * *